United States Patent [19]

Invernizzi et al.

[11] Patent Number: 4,666,723

[45] Date of Patent: May 19, 1987

[54] METHOD FOR SHAPING AND PACKAGING A PLURALITY OF SPREADABLE FOOD PRODUCTS

[75] Inventors: Rutilio Invernizzi, Milan; Giancarlo Montesissa, Robbio, both of Italy

[73] Assignee: Nestec S.A., Vevey, Switzerland

[21] Appl. No.: 611,090

[22] Filed: May 17, 1984

[30] Foreign Application Priority Data

Jun. 13, 1983 [EP] European Pat. Off. ............ 83105777

[51] Int. Cl.⁴ .................. B65B 1/04; B65B 3/12; B65B 3/32

[52] U.S. Cl. .................... 426/414; 53/436; 53/122; 53/237; 53/239; 141/9; 141/105; 141/100; 222/135; 425/130; 425/131.1; 425/132; 426/413; 426/249; 426/130; 426/515; 426/516; 426/232

[58] Field of Search ............... 426/414, 123, 410, 413, 426/396, 249, 130, 515, 516, 232; 53/436, 122, 529, 530, 237, 238, 239; 425/130, 132, 131.1; 141/9, 100, 258, 248, 105, 102, 103; 222/135

[56] References Cited

U.S. PATENT DOCUMENTS

| | | | |
|---|---|---|---|
| 1,463,851 | 8/1923 | Smith | 426/249 |
| 1,486,748 | 3/1924 | Hilgers | 53/519 |
| 2,145,240 | 1/1939 | Adams | 141/9 |
| 2,214,325 | 9/1940 | Gothe | 425/131.1 |
| 2,313,060 | 3/1943 | Freidman | 425/132 |
| 2,334,052 | 11/1943 | Wedin | 426/249 |
| 2,481,690 | 9/1949 | Schaub | 426/516 |
| 2,683,932 | 7/1954 | Steenhuis | 17/32 |
| 2,750,900 | 6/1956 | Moore | 425/131.1 |
| 2,790,594 | 4/1957 | Hultkrans et al. | 426/123 |
| 2,803,381 | 8/1957 | Vouderis | 222/135 |
| 3,080,238 | 3/1963 | Kraft et al. | 426/123 |
| 3,113,530 | 12/1963 | Vestermark | 53/516 |
| 3,174,652 | 3/1965 | Villemure | 141/105 |
| 3,179,041 | 4/1965 | Luthi et al. | 53/517 |
| 3,196,809 | 7/1965 | Nelson et al. | 425/131.1 |
| 3,242,881 | 3/1966 | Schafer | 425/131.1 |
| 3,295,466 | 1/1967 | Bell et al. | 426/249 |
| 3,295,467 | 1/1967 | Gropen | 426/249 |
| 3,324,905 | 6/1967 | Paulo | 141/100 |
| 3,342,143 | 9/1967 | Bell | 426/249 |
| 3,359,925 | 12/1967 | Porada . | |
| 3,366,309 | 1/1968 | Scharre | 426/123 |
| 3,372,654 | 3/1968 | Bell | 426/249 |
| 3,377,964 | 4/1968 | Bell et al. | 425/132 |
| 3,392,685 | 7/1968 | Briggs | 222/145 |
| 3,427,999 | 2/1969 | Schultz | 425/132 |
| 3,468,026 | 9/1969 | Robertson et al. | 426/491 |
| 3,511,669 | 5/1970 | Swartz et al. | 426/414 |
| 3,563,764 | 2/1971 | Posegate | 426/414 |
| 3,721,060 | 3/1973 | Quinto | 53/576 |
| 3,730,740 | 5/1973 | Schack et al. | 426/513 |
| 3,734,274 | 5/1973 | Korner | 426/123 |
| 3,924,803 | 12/1975 | Habsburg | 426/123 |
| 3,991,217 | 11/1976 | Kinney | 426/249 |
| 4,001,450 | 1/1977 | Ford et al. | 426/410 |
| 4,015,644 | 4/1977 | Kinney | 141/9 |
| 4,019,547 | 4/1977 | Ross | 53/437 |
| 4,052,836 | 10/1977 | Shaw | 426/414 |
| 4,058,953 | 11/1977 | Sanborn et al. | 426/396 |
| 4,120,984 | 10/1978 | Richardson et al. | 426/396 |
| 4,223,512 | 9/1980 | Buchner | 426/396 |
| 4,363,822 | 12/1982 | Kleptz | 426/414 |

FOREIGN PATENT DOCUMENTS

| | | | |
|---|---|---|---|
| 98324 | 5/1958 | Denmark | 141/105 |
| 854740 | 11/1960 | United Kingdom | 141/105 |

Primary Examiner—Steven Weinstein
Attorney, Agent, or Firm—Vogt & O'Donnell

[57] ABSTRACT

To produce and package portions of spreadable food products, for example differing types of processed cheese, in multiple layers, the layers are shaped individually in shaping compartments by keeping them separate and, while being ejected, they are guided individually to the bottom of a pre-shaped shell and substantially all traces of spread are eliminated from the shaping compartments.

The apparatus comprises a unit for the separate metering of each group of layers of the same nature (7), for the separate and alternate shaping of the layers, for the ejection and guidance of the layers into the shell (5, 6); units for applying a tear strip for quick opening (2, 3) and for stamping a shell (4) upstream of the metering unit (5) and, downstream thereof, units for applying lids (11), for following back the edges (12), for fixing the edges (13) and for removing the packaged portion (14).

5 Claims, 12 Drawing Figures g

METHOD FOR SHAPING AND PACKAGING A PLURALITY OF SPREADABLE FOOD PRODUCTS

The present invention relates to a process for metering, shaping and optionally packaging multi-layered portions of spreadable food products and to an apparatus for carrying out the process.

Portions of spreadable food products such as, for example, creamy processed cheeses are usually produced by pouring measured amounts of spread, under hot conditions, from a nozzle into shells of the desired shape with raised edges, fitting a cover, folding back and fixing the edges and removing the packed portions. It is difficult to meter the portions exactly and attempts to shape them prior to moulding have been abandoned owing to their viscous and sticky consistency. The problem is aggravated if they are arranged as distinct layers, by combining spreads which have quite different visual and organoletic properties but which complement each other, to give the portions a contrasting stratified appearance, significantly improving the organoleptic sensations over those induced by the same products premixed in the portion.

According to the patent No. CH 538,814 and the published patent application FR No. 2,310,084, for example, portions of processed cheese are given a marbled appearance by injection additives or a second spread with a different flavour or colour into a stream of first spread, upstream of the nozzle discharging the product into the shells. These processes do not produce the desired stratified portions.

Another method described in published patent application FR No. 2,475,361 proposes that the retentate from ultrafiltration of milk, before addition of rennet, be transformed into multi-layered cheeses by successively moulding each liquid layer on the previous, already coagulated layer or by mixing retentates of differing density which separate in the moulds by gravity and subsequently coagulate. This method can be applied only to cream cheeses and, moreover, produces only horizontal layers, the stratified appearance not being visible immediately the packaging is opened.

Another process illustrated in U.S. Pat. No. 3,359,925 permits production of blocks of two-flavoured ice-cream arranged chequer-wise, whereas, according to U.S. Pat. No. 3,991,217, some pots are filled with several layers of different flavoured ice-creams arranged in vertical slices. According to these patents, at least two ice-creams of different flavour are transferred into a shaping chamber consisting of several compartments separated by thin walls, in which the layers are formed individually one beside the other and are extruded simultaneously into a packaging container by means of pistons. These processes would not allow the desired multi-layered portions to be metered and shaped from spreadable products and, in particular, from processed cheeses as they would very quickly adhere to the pistons.

The present process solves the problem of producing multi-layered portions of a spreadable product such as, for example, processed cheese. It involves transferring individual measured amounts of spread, corresponding to the group of layers making up the portion and which also corresponds to the volume of the container into which the portion is to be deposited, from at least two feed hoppers each containing a different spread, into at least two adjacent layer shaping compartments in a shaping chamber in which the layers of the differing spreads are formed individually, one beside the other, and are separated by the partition walls, and then simultaneously ejecting all of the layers consitituting the portion from the shaping chamber through a nozzle extending this chamber into a pre-shaped shell.

The process is characterised by the fact that, whilst the layers are being ejected, they are guided individually to the bottom of the shell, with a minimum of deformation, and substantially all traces of spread are eliminated from the shaping chambers.

In this particular embodiment of a packaged portion, for example of processed cheese, the process also involves metering and shaping operations, applying a tear strip for easy opening, preparing a shell prior to metering and, after metering, fitting a lid, folding back and fixing the edges and removing the packed portions.

The invention also relates to an apparatus for carrying out the process, essentially comprising a unit for the separate metering of each group of layers of the same nature, for separate and alternate shaping of the layers, and for the ejection and guidance and depositing of each group of layers into the shell.

The apparatus is characterised by the fact that the metering and shaping unit comprises means for shaping the layers separately, means for ejecting the layers simultaneously, means for guiding and depositing the layers individually into the bottom of the shell throughout the ejection operation and means for eliminating substantially all residual traces of spread from the shaped layers.

According to a particular embodiment in which portions, for example of processed cheese, are to be packaged, the apparatus also comprises units for the application of a tear strip for opening, and for stamping a shell upstream of the metering unit and units for fitting a lid, folding back the edges, fixing the edges and removing the packaged portion down-stream thereof.

The attached drawings show, by way of example, an embodiment of the invention.

BRIEF DESCRIPTION OF THE DRAWINGS

In FIG. 1, a film which forms the shell and which can be composed, for example, of composite plastics material or preferably aluminium, is unwound from a spool 1 to a unit for the application of tear strips for easy opening 2. The blank is cut to the desired shape at unit 3. At 4, the shell is shaped by stamping (or heat shaping in the case of a plastics film, in which case this operation preferably takes place prior to cutting) and is placed at the bottom of a cavity brought by a conveyor belt or preferably a rotating table (not shown) which advances rhythmically and which has the function of transferring the cavity from one unit to another. At unit 5, the shell held in the cavity is lifted to a shaping and ejection unit 6 from which it receives the layers which have in the meantime been shaped. The spreads forming the layers originate from two groups of multiple feed fillers 7 connected to two feed hoppers 8. The film, for example of aluminium, for the preparation of the lid is unwound from a spool 9 and travels towards a cutting unit 10. In the following phase 11, the lid is placed on the portion and the shell is closed while still in its cavity. At the following units, the edges of the shell are folded back over the lid 12 and are fixed, for example, by heat-welding using a heated press 13. The packaged portion is ejected from the cavity at unit 14 and is delivered from the conveyor belt or table.

In FIGS. 2a and 2b, the central body of the shaping chamber 15 is constituted by a number of partitions (not shown) and of thin steel alloy plates 16 which are held between two head members and define five layer shaping compartments 17 (one compartment and the adjacent compartment have been shown with only a portion of the dividing wall between the two compartments for the sake of clarity).

Figure 1:
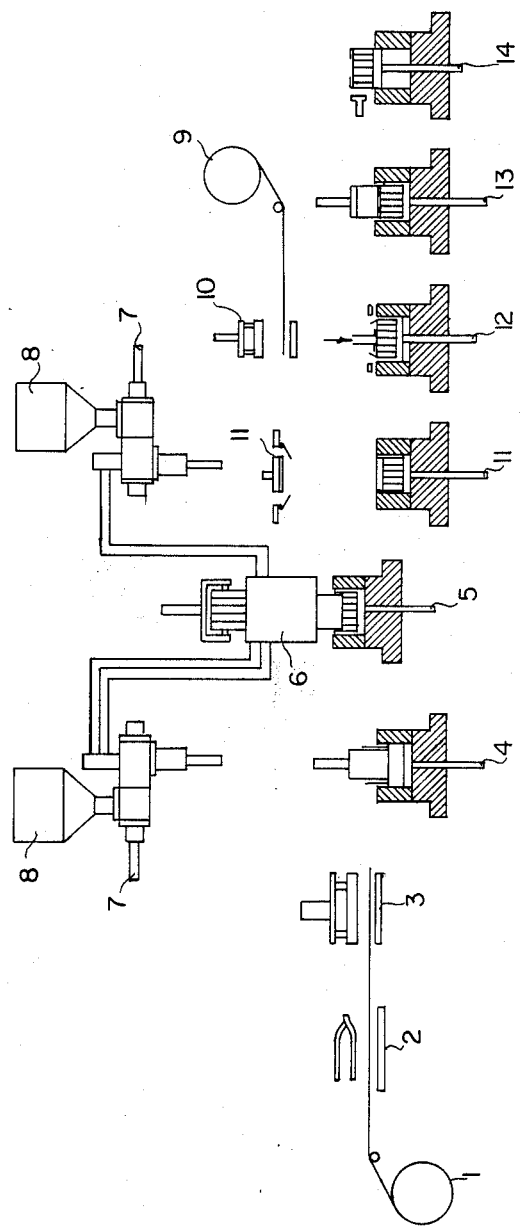
FIG. 1 shows a schematic view of an entire apparatus for the production of multi-layered portions.
Figure 2A:
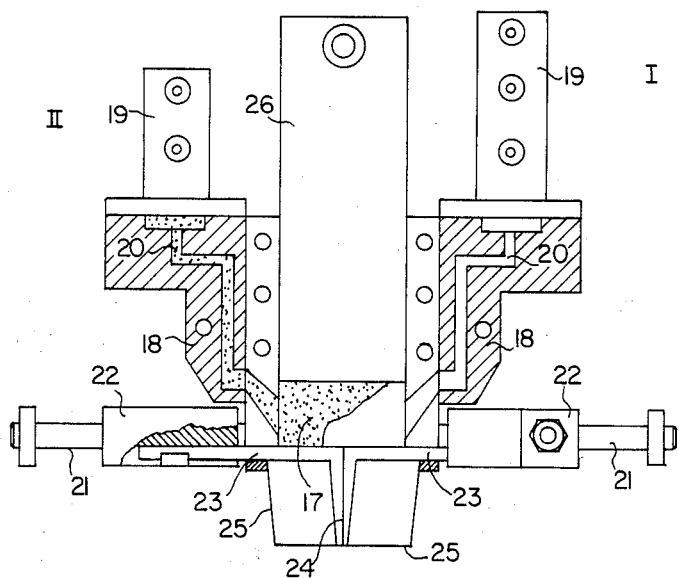
FIG. 2a is a side view with a more detailed partial longitudinal section of the shaping unit.
Figure 2B:
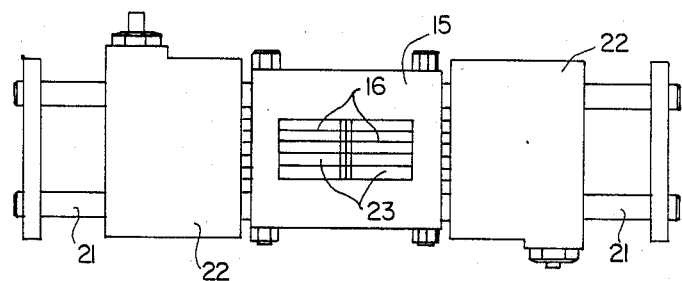
FIG. 2b is a view of the shaping assembly from below.

Two supports 18 fix the shaping assembly to the structure of the machine and direct the product arriving from the headers 19 via feed pipes 20 to the shaping compartments 17 through the shaping chamber housing wall at the base of the shaping compartments. According to one embodiment, the right-hand header connects three pipes for the intake of product I originating from one of the multiple feed fillers 7 (shown on the left of FIG. 1); the lefthand header connects the two pipes for the intake of product II originating from the other multiple feed filler 7 (shown on the right of FIG. 1). The layers are metered by two groups of multiple feed fillers with controlled valves (not shown). The layers are metered individually into separate compartments: the layers of product I via a group having three elements and the layers of product II via a group having two elements. The weight of the layers can be determined in advance and can be regulated continuously for each group of fillers in known manner by adjusting the stroke of the filler pistons.

At the bottom end of the central body, or base of the shaping chamber, there are two shafts 21 on which two carriages 22 slide supporting hammer-shaped elements 23, capable of laterally reciprocating which constitute the bottom of the shaping chamber with their thin ends 24 pointing downwards. These reciprocating elements 23 open and close the shaping chamber at its bottom end, or base, by sliding laterally between the dividing walls 16.

The elements 23 are enclosed in a protective housing 25 having the shape of a parallelepiped and with a slight relief on two of its walls. As illustrated, the housing 25 is co-extensive with and an extension of the shaping chamber housing wall. This housing extends the shaping chamber and its compartments and constitutes a nozzle for pouring the spreads which is adapted to enter the shell. Five vertically slidable ejection devices 26 made, for example, from wear-resistant plastics material, are adjusted so as to slide co-extensively with the interior and beyond the base of the compartments of the shaping chamber and push the layers out of the shaping chamber, depositing them at the bottom of the shell.

Figure 3:
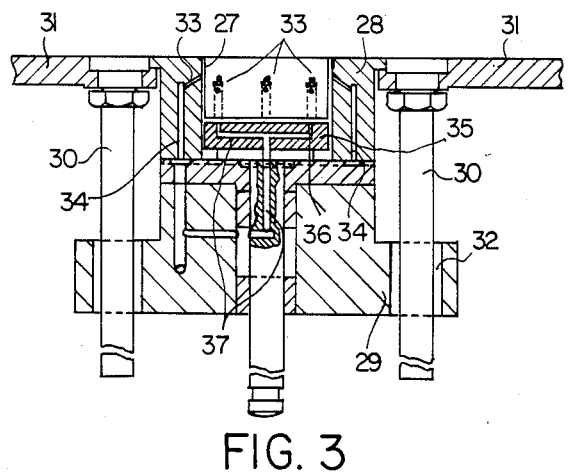
FIG. 3 illustrates an embodiment of the device for conveying the shells from one unit to another in the apparatus, showing a detailed section of a cavity type conveyor.

In FIG. 3, a shell 27 is placed in a cavity 28 which has the functions of receiving the shell coming from the stamping unit, conveying it beneath the shaping unit, lifting it up to the pouring nozzle, lowering it as the layers are ejected from the shaping compartments and removing the packaged portion. The cavity 28, made, for example, of special aluminium, is supported by a carriage 29 sliding on two vertical shafts 30 integral with a rotating table 31 by means of axial bearings 32. Openings 33 are distributed over the side walls of the cavity 28. These openings are connected by pipes 34 to a vacuum system and their function is to hold the sides of the shell against the walls of the cavity, in particular to make it easier to introduce the pouring nozzle of the shaping device into the shell. The bottom of the cavity is constituted by a moving piston 35 which enables the shell to be located vertically beneath the folding unit (FIG. 1, numeral 12) and enables the packaged portion to be ejected once the edges have been fixed (FIG. 1, numerals 13 and 14). Some openings 36 are provided in the piston 35 and connected by pipes 37 to the above-mentioned vacuum system. Their function is to prevent the shell from being dragged upwards after being filled, due to the suction caused by the return of the ejectors, as described in more detail below.

Figure 4:
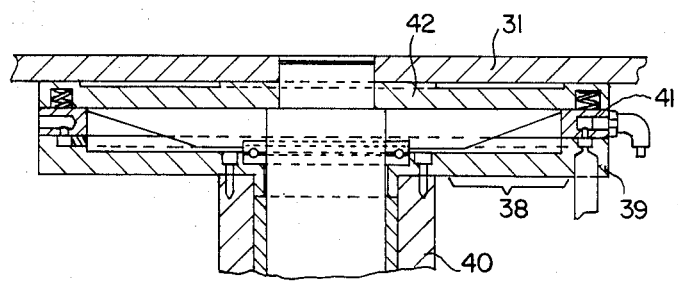
FIG. 4 is a partial section through an embodiment of the device for conveying the shells.

The vacuum pipes 34,37 are connected to a vacuum distribution cam 38 mounted on the rotating table 31 shown in FIG. 4 which has the function of opening and closing the connections with the vacuum during the operating cycle. The cam 38 consists of two portions of which one 39, the stationary portion, is connected to the central support 40 of the rotating table and of which the other 41, the moving portion, is integral with the support 42 of the rotating table 31.

Figure 5:
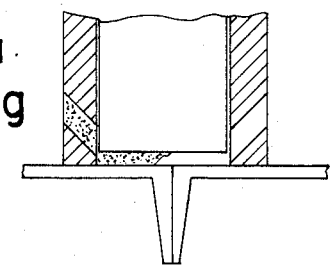
Figure 5:
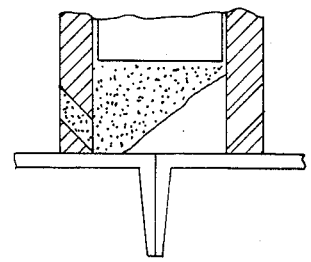
Figure 5:
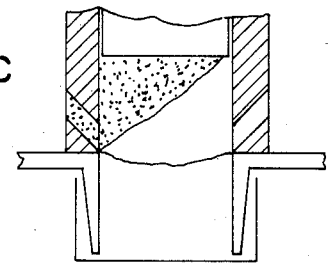
Figure 5:
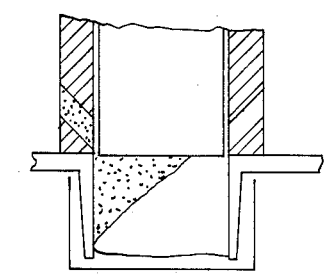
Figure 5:
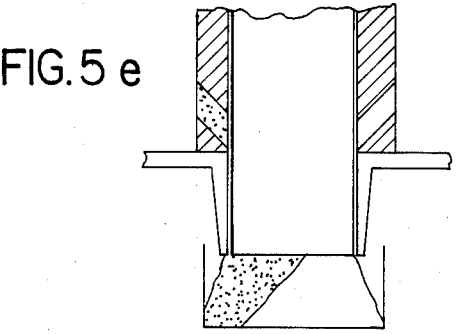
Figure 5:
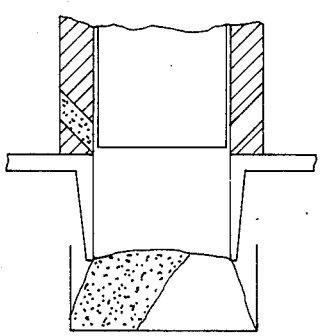

The diagrams in FIG. 5 illustrate the metering shaping, ejection and depositing of measured amounts of each differing spreadable food product in two adjacent layers of the portion, omitting a portion of the dividing wall between the two layers for the sake of clarity.

At A, the laterally slidable reciprocating hammer-shaped elements are closed, the vertically slidable ejectors are shown in an intermediate position and measured amounts of the spreads are metered and introduced through the shaping chamber housing wall at the base of the shaping compartments.

At B, the ejectors rise to leave room for the products filling the shaping compartments and thus the measured amounts are formed and shaped into adjacent layers in a quantity corresponding to the volume of the container.

At C, the shell is conveyed to beneath and within the proximity of the shaping chamber and is raised up such that the bottom of the container shell is proximate to the bottom of the base housing and the distended portions of the laterally slidable elements constituting the end of the pouring nozzle and, simultaneously, the elements slide and open the bottom of the compartments.

At D, the layers are simultaneously ejected and are pushed to the bottom of the shell in discrete layers by the ejectors.

At E, the shell descends at the same time as the ejectors which are completing their travel downwards until the bases of the ejectors reach the lower edge of the distended portion of the laterally slidable hammer-shaped elements and base housing to complete filling the container shell.

At F, the ejectors rise above the hammer-shaped laterally slidable elements whilst restraining the filled container from movement, and at G the elements close, ejecting substantially all the remains of spread from the shaping chamber. The tapered end of the elements helps to detach the product while the shell falls to the level of the table which rotates so as to bring the cavity to the following unit, and the cycle recommences from position A.

It can be seen that, in phases D, E and F, the product is guided by the elements to the bottom of the shell whereas, at E, all the layers are deposited smoothly in the shell. It is obvious that the progressiveness of the relative movement between the shell and the ejectors is of paramount importance for avoiding deformation of the layers. As a variation, therefore, the shell could be kept stationary in the position which it occupies at D and the shaping chamber could be raised while the ejectors descend. This is of less advantage, however, due to the greater mechanical stresses.

It has also been found that it is important for the edges of the shell to be held flat against those of the cavity by the vacuum during phases C to F whereas, in phase F, the bottom of the shell must be held on the piston also by the effect of the vacuum to prevent the portion from being sucked upwards when the ejectors rise.

Figure 6:
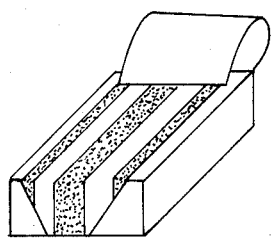
FIG. 5 illustrates schematically sequences of shaping and conveying the portion in the shell and FIG. 6 shows a perspective view of a portion with the packaging open, revealing the striped structure of the portion.

FIG. 6 shows a packaged portion exhibiting the different layers. The portion has the shape of a rectangular parallepiped. It is obvious that it could assume, for example, the shape of a parallelepiped of square base, a cube, a right prism of polygonal base, etc. Similarly, layers having the same shape as the portion have been shown but they could easily be of different shape and number and could also differ from each other by adapting the geometry of the shaping compartments, of the ejectors, of the pouring nozzle and of the shell and by regulating the quantity of product to be metered, into the compartments.

The constituents of two adjacent layers of the portion will preferably be well contrasted from the point of view of colour, taste and consistency, providing that the spreads are compatible with each other, in order to prevent their constituents from migrating during storage due, for example, to a difference in osmotic pressure. Similarly, close rheological behaviour will prevent difficulties of metering and filling.

The cheese spreads may contain additives such as colorants, small particles, for example, of spices or flavourings or also shaped elements such as pieces of fruit, for example walnuts, hazelnuts, grapes etc. The combination of a cheese spread having a full-bodied taste with a mild spread such as, for example, acidic curd rich in fats—acidic curd rich in fats, flavoured with herbs and pepper; ripe cheddar, butter and pepper—fontal and butter; ripe provolone and cheddar—fontal and butter; ripe emmenthal and butter—acidic curd rich in fats and cream, acidic curd rich in fats, mascarpone-roquefort, gorgonzola, etc.

Although the apparatus is particularly adapted for the metering and shaping of cheese spreads, it can obviously be used for producing portions of other spreadable and sticky food products such as fruit jellies, chocolate spreads, confectionery compositions, cereal pasta, purees etc, optionally combined with compatible cheese spreads.

The various mechanisms of the installation are controlled in a known but not illustrated manner by a main shaft driven by a hydraulic motor or by an electric reduction motor. The main shaft drives a countershaft bearing guided cams and eccentric discs to which levers are connected, these levers actuating in synchronization the moving parts of the various units such as filling pistons, elements, ejectors, cavities, pistons, etc. The various elements could also be controlled by pneumatic means. In the embodiment consisting of a rotating table, the rotating table can be actuated in step-wise fashion by a known, so-called "Maltese cross" mechanism.

We claim:

1. A method for packaging, by metering, shaping and depositing differing spreadable food products in distinct layers into a container by means of a shaping chamber and a means to guide the food products into the container; said chamber having at least two separate adjacent layer shaping compartments, each compartment defined by partition walls which prevent mixing therebetween and each compartment capable of receiving a differing spreadable food product through a respective wall of said shaping chamber at the base of each compartment, and each compartment having a vertically slidable ejector means capable of sliding co-extensively with the interior and beyond the base of each compartment; said chamber further having a base defined by two laterally slidable reciprocating hammer-shaped elements when said elements are in communication with each other in a closed position, each hammer-shaped element having a lower distended portion, encompassed by a housing wall which is co-extensive with and an extension of the shaping chamber housing wall, said hammer shaped elements when open and said housing wall defining said means to guide the food products, said method comprising:
   (a) metering and introducing measured amounts of each differing spreadable food product into a separate compartment through said respective wall at the base of each compartment, while raising each vertically slidable ejector means within each compartment and while maintaining said laterial slidable reciprocating elements in communication one with the other in a closed position, to simultaneously form and shape the measured amounts into adjacent layers in a quantity corresponding to the volume of the container;
   (b) conveying said container beneath and within proximity of the shaping chamber such that the bottom of the container is proximate to the lowermost part of the housing wall and the distended portions of the laterally slidable elements;
   (c) opening the laterally slidable elements and then ejecting each formed and shaped layer simultaneously from each compartment through the open elements and through the housing in discrete layers, such that adjacent layers come into contact and remain discrete layers, by pushing each layer simultaneously downwards into the container to fill the container by means of lowering each ejector means to the bottom of each compartment;
   (d) then moving the container away from the shaping chamber, the lowermost part of the housing wall and the laterally slidable elements and continuing the movement of each ejector means downward until the base of each ejector means reaches the lower edge of the distended portion of the laterally slidable elements and lowermost part of the housing wall to complete filling the container;
   (e) then raising each ejector means to the bottom of each compartment whilst restraining the container from movement and closing the laterally slidable elements; and (f) removing the filled container from proximity with the shaping chamber.

2. A method according to claim 1, wherein the container is carried by a cavity and held against the sides and the bottom of the cavity by means of a vacuum.

3. A method according to claim 1 wherein when the shaped layers of spread are ejected, the container remains stationary whilst the shaping chamber rises when the ejectors descend from the bottom of the shaping chamber compartments.

4. A method according to claim 1 wherein when the shaped layers of spread are ejected, the shaping chamber remains stationary whilst the the container descends when the ejectors descend from the bottom of the shaping chamber compartments.

5. A method according to claim 1, further comprising applying at least one strip of a material to a container material, cutting a blank of the container material and applied strip material and shaping the blank to form the container, conveying the container to the shaping chamber to fill the container, filling the container to below the top edge of the container, and afater removing the filled container from the proximity of the shaping chamber, fitting a lid within the top edge of the filled container and folding back and fixing the top edge of the container over the lid.

* * * * *

UNITED STATES PATENT AND TRADEMARK OFFICE
CERTIFICATE OF CORRECTION

PATENT NO.  : 4,666,723
DATED       : May 19, 1987
INVENTOR(S) : Rutilio Invernizzi et al.

It is certified that error appears in the above-identified patent and that said Letters Patent is hereby corrected as shown below:

In the abstract, line 5, "while" should read --whilst--.

In the abstract, line 16, "following" should read --folding--.

Column 1, line 28, "injection" should read --injecting--.
Column 1, line 68, after "compartments" insert the phrase
--, defined by partition walls--.
Column 3, line 35, "lefthand" should read --left-hand--.

Signed and Sealed this

Twenty-fifth Day of August, 1987

Attest:

DONALD J. QUIGG

Attesting Officer

Commissioner of Patents and Trademarks